(12) United States Patent
Thomas

(10) Patent No.: US 12,539,904 B2
(45) Date of Patent: Feb. 3, 2026

(54) LIFT WHEEL LOCK FOR INSTALLING AND/OR REMOVING VAPORIZER VESSELS

(71) Applicant: ENTEGRIS, INC., Billerica, MA (US)

(72) Inventor: Jacob Thomas, Leander, TX (US)

(73) Assignee: ENTEGRIS, INC., Billerica, MA (US)

(*) Notice: Subject to any disclaimer, the term of this patent is extended or adjusted under 35 U.S.C. 154(b) by 237 days.

(21) Appl. No.: 17/725,473

(22) Filed: Apr. 20, 2022

(65) Prior Publication Data

US 2022/0340185 A1 Oct. 27, 2022

Related U.S. Application Data

(60) Provisional application No. 63/178,859, filed on Apr. 23, 2021.

(51) Int. Cl.
*B62B 3/04* (2006.01)
*B60B 33/02* (2006.01)
*B66F 9/075* (2006.01)

(52) U.S. Cl.
CPC .............. *B62B 3/04* (2013.01); *B60B 33/025* (2013.01); *B60B 33/028* (2013.01); *B66F 9/07509* (2013.01); *B60B 2200/43* (2013.01); *B60B 2900/3312* (2013.01); *B62B 2301/044* (2013.01); *B62B 2301/0463* (2013.01); *B62B 2501/02* (2013.01)

(58) Field of Classification Search
CPC ................ B62B 3/04; B62B 2301/044; B62B 2301/0463; B62B 2501/02; B62B 5/04; B62B 5/049; B62B 2301/04; B62B 2203/70; B62B 3/1404; B60B 33/025; B60B 33/028; B60B 2200/43; B60B 2900/3312; B66F 9/07509; B66F 9/06; B60P 1/649; B65G 1/04
See application file for complete search history.

(56) References Cited

U.S. PATENT DOCUMENTS 1,861,919 A * 6/1932 Hill ..................... B60B 33/045
16/37
2,925,887 A * 2/1960 Gibson ............... B66F 9/07513
187/226

(Continued)

FOREIGN PATENT DOCUMENTS

CA 2067761 A1 * 4/1991
CA 3012219 A1 * 1/2020 ............... B62B 3/18

(Continued)

*Primary Examiner* — Vishal R Sahni

(57) ABSTRACT

A delivery system includes a handheld electric lift configured to lift at least one vaporizer vessel, and a cabinet configured to hold the at least one vaporizer vessel. The lift includes an elongated mast, an effector attached to the mast, a handler configured to move the lift, and at least one caster. The effector is controlled by an electric power source to move along the mast. Each of the at least one caster includes a stopper and a wheel. The stopper is elongated and is disposed above the wheel. The stopper is configured to engage with the wheel to prevent the wheel from swiveling when the stopper is pushed down. The stopper is further configured to disengage with the wheel to allow the wheel to swivel when the stopper is released. The cabinet includes at least one channel configured to accommodate the at least one caster.

15 Claims, 14 Drawing Sheets

(56) References Cited

U.S. PATENT DOCUMENTS

| | | | | |
|---|---|---|---|---|
| 3,636,586 A * | 1/1972 | Bollinger | | B60B 33/028 |
| | | | | 16/35 R |
| 3,672,634 A * | 6/1972 | Chaffin | | B62B 3/0618 |
| | | | | 414/458 |
| 4,184,227 A * | 1/1980 | Propst | | B60B 33/021 |
| | | | | 16/35 R |
| 4,450,968 A * | 5/1984 | Muellner | | A47F 10/04 |
| | | | | 410/3 |
| 5,331,717 A * | 7/1994 | Joslin | | B60B 33/028 |
| | | | | 16/35 R |
| 5,517,718 A * | 5/1996 | Eichhorn | | B60B 33/025 |
| | | | | 16/45 |
| 6,336,524 B1 * | 1/2002 | Van Loon | | B62B 5/0485 |
| | | | | 188/19 |
| 7,083,175 B1 * | 8/2006 | Liu | | B60B 33/0039 |
| | | | | 280/47.38 |
| 7,628,410 B2 * | 12/2009 | Fitzgerald | | G07F 7/0645 |
| | | | | 280/47.35 |
| 8,302,975 B2 * | 11/2012 | Hergeth | | B62B 3/04 |
| | | | | 414/788.3 |
| 8,967,635 B2 * | 3/2015 | Paul | | A47C 7/62 |
| | | | | 280/47.38 |
| 10,093,334 B1 * | 10/2018 | Brown | | B62B 3/005 |
| 10,703,562 B2 * | 7/2020 | Cavelius | | B65G 1/023 |
| 10,905,612 B2 * | 2/2021 | Derenne | | A61G 7/08 |
| 11,234,879 B2 * | 2/2022 | Linde | | A61G 7/1017 |
| 2006/0279051 A1 * | 12/2006 | Stokes | | B60B 33/0039 |
| | | | | 280/33.991 |
| 2008/0272565 A1 * | 11/2008 | Fitzgerald | | A47B 83/00 |
| | | | | 280/47.35 |
| 2010/0077562 A1 * | 4/2010 | Block | | B60B 33/0057 |
| | | | | 16/46 |
| 2012/0317799 A1 | 12/2012 | Selby | | |
| 2015/0321761 A1 * | 11/2015 | Young | | B62B 5/049 |
| | | | | 280/47.34 |
| 2016/0185371 A1 * | 6/2016 | Churchvara | | B62B 3/108 |
| | | | | 280/33.998 |
| 2017/0349325 A1 * | 12/2017 | Doggett | | B65D 19/0002 |
| 2020/0000664 A1 * | 1/2020 | Linde | | B60B 33/026 |
| 2022/0135103 A1 * | 5/2022 | Peterson | | B62B 3/10 |
| | | | | 280/47.34 |

FOREIGN PATENT DOCUMENTS

| | | | | |
|---|---|---|---|---|
| CN | 206014332 U | | 3/2017 | |
| DE | 9103536 U1 | | 6/1991 | |
| DE | 102007039208 A1 | * | 5/2008 | ........... A61G 7/0528 |
| DE | 102018124575 A1 | * | 4/2020 | ........... B60B 33/026 |
| EP | 0913273 A1 | * | 5/1999 | |
| EP | 1818185 A1 | * | 8/2007 | ......... B60B 33/0005 |
| GB | 674662 A | * | 6/1952 | |
| GB | 1339152 A | * | 11/1973 | |
| GB | 2269095 A | * | 2/1994 | ........... B60B 33/025 |
| GB | 2389084 A | * | 12/2003 | ......... B60B 33/0049 |
| GB | 2457787 A | * | 9/2009 | ......... B60B 33/0021 |
| JP | S5914482 A | | 1/1984 | |
| JP | S60125273 U | | 8/1985 | |
| JP | 2516453 Y2 | * | 11/1996 | |
| JP | 2020101319 A | | 7/2020 | |
| TW | 201202114 A | | 1/2012 | |
| TW | M455494 U | | 6/2013 | |
| WO | WO-2005005166 A1 | * | 1/2005 | ......... B60B 33/0007 |
| WO | 2017210733 A1 | | 12/2017 | |

* cited by examiner

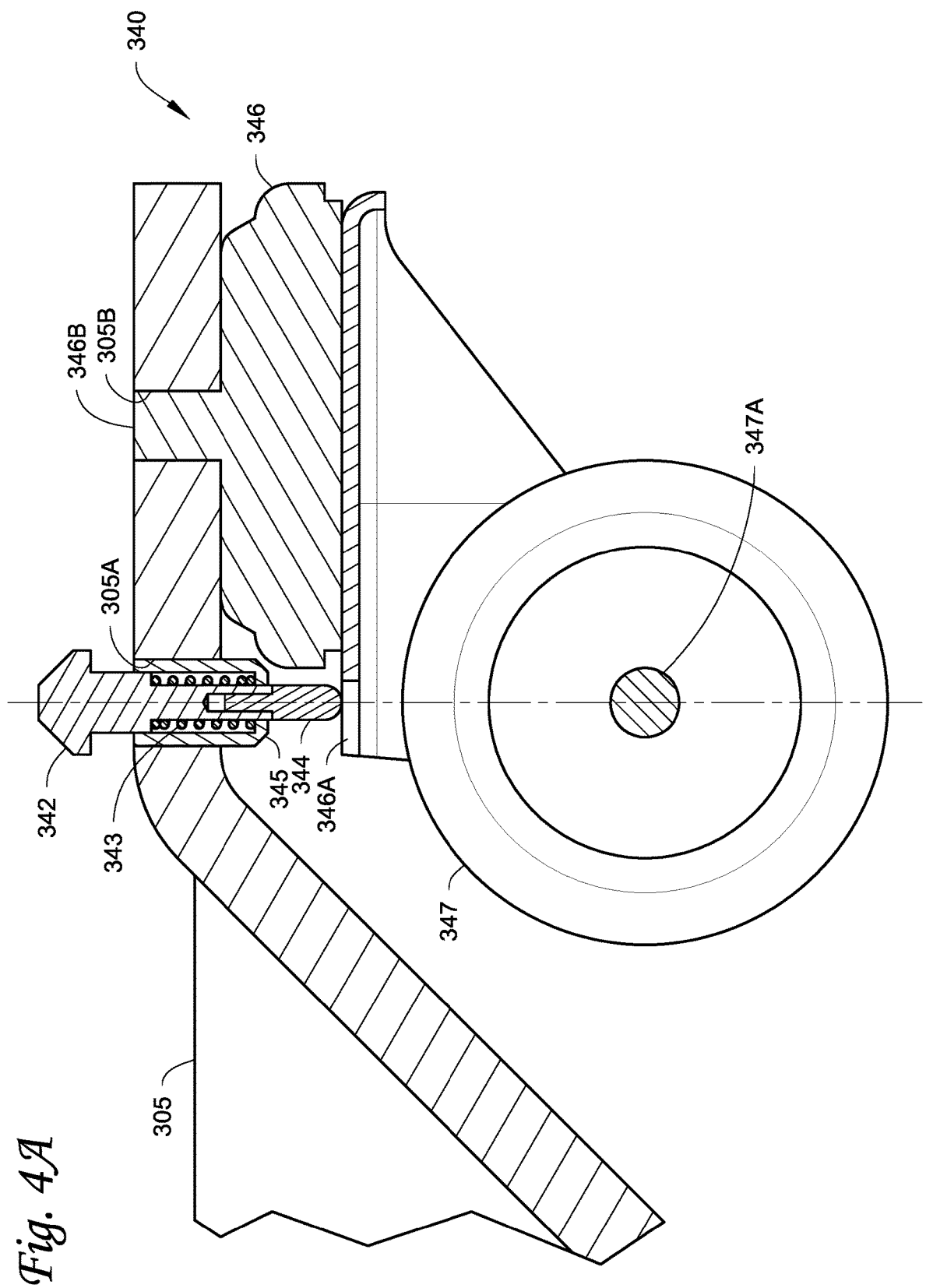

LIFT WHEEL LOCK FOR INSTALLING AND/OR REMOVING VAPORIZER VESSELS

FIELD

This disclosure relates generally to installing and/or removing vaporizer vessel(s) into and/or from a cabinet (e.g., a solid delivery cabinet). More specifically, the disclosure relates to apparatus and systems for installing and/or removing vaporizer vessel(s) into and/or from a solid delivery cabinet using a handheld electric lift with stopper(s) interacting with channel(s) of the solid delivery cabinet to engage and/or disengage with wheel(s) of the handheld electric lift.

BACKGROUND

In the use of source reagents (such as liquids and/or solid source reagents for vapor in processes such as chemical vapor deposition, atomic layer deposition, and/or ion implantation processes), which are heated to form the source reagent vapor for deposition or implantation, vaporizer vessel(s) can be adapted to hold the source reagents. The vaporizer vessel(s) are to be installed into or removed from a cabinet (e.g., a solid delivery cabinet) before and/or after operation, and safety requirements for installation and removal need to be met according to industry standard(s).

SUMMARY

This disclosure relates generally to installing and/or removing vaporizer vessel(s) into and/or from a cabinet (e.g., a solid delivery cabinet). More specifically, the disclosure relates to apparatus and systems for installing and/or removing vaporizer vessel(s) into and/or from a solid delivery cabinet using a handheld electric lift with stopper(s) interacting with channel(s) of the solid delivery cabinet to engage and/or disengage with wheel(s) of the handheld electric lift.

When installing and/or removing vaporizer vessel(s) into and/or from a cabinet such as a solid delivery cabinet before and/or after operation, safety and other requirements (e.g., Semiconductor Equipment and Materials International (SEMI) standards, see e.g., https://www.semi.org) for installation and removal need to be met. The footprint constraint(s) of the solid delivery cabinet installed at the customer's site (typically in a narrow area having e.g., grated floor, etc.) also need to be considered, as well as the weight capacity needed to lift the heavy solid delivery vaporizer vessel(s). Embodiments disclosed herein can provide a handheld electric lift with stopper(s) interacting with channel(s) of the solid delivery cabinet, to ensure a safe and assisted installation and/or removal of the vaporizer vessel(s) into and/or from the solid delivery cabinet.

In an embodiment, a handheld electric lift includes an elongated mast, an effector attached to the mast, a handler configured to move the lift, and at least one caster. The effector is controlled by an electric power source to move along the mast. Each of the at least one caster includes a stopper and a wheel. The stopper is elongated and is disposed above the wheel. The stopper is configured to engage with the wheel to prevent the wheel from swiveling when the stopper is pushed down. The stopper is further configured to disengage with the wheel to allow the wheel to swivel when the stopper is released.

In an embodiment, the wheel is a swivel wheel.

In an embodiment, the at least one caster includes two front casters, the lift further comprises two back casters.

In an embodiment, a width of the lift is at or about 21 inches.

In an embodiment, a weight capacity of the lift ranges from at or about 120 pounds to at or about 200 pounds.

In an embodiment, the stopper includes an elongated pin.

In an embodiment, the stopper includes an elastomer. When stopper is not pushed, the elastomer is configured to release the stopper so that the stopper disengages with the wheel.

In an embodiment, a delivery system includes a handheld electric lift configured to lift at least one vaporizer vessel, and a cabinet configured to hold the at least one vaporizer vessel. The lift includes an elongated mast, an effector attached to the mast, a handler configured to move the lift, and at least one caster. The effector is controlled by an electric power source to move along the mast. Each of the at least one caster includes a stopper and a wheel. The stopper is elongated and is disposed above the wheel. The stopper is configured to engage with the wheel to prevent the wheel from swiveling when the stopper is pushed down. The stopper is further configured to disengage with the wheel to allow the wheel to swivel when the stopper is released. The cabinet includes at least one channel configured to accommodate the at least one caster.

In an embodiment, the at least one channel includes two channels. Each of the two channels is configured to accommodate each of the two front casters, respectively.

In an embodiment, the at least one channel is disposed at a bottom of the cabinet.

In an embodiment, the at least one channel is configured such that a top wall of the at least one channel pushes down the stopper to prevent the wheel from swiveling when the at least one caster is accommodated in the at least one channel.

In an embodiment, the cabinet is fixed to a grated floor.

In an embodiment, the cabinet is bolted to the grated floor.

In an embodiment, the at least one channel includes a top wall. When the stopper is disengaged with the wheel, an altitude of the top wall is lower than an altitude of the stopper such that the top wall pushes down the stopper and the stopper engages with the wheel when the at least one caster is accommodated in the at least one channel.

BRIEF DESCRIPTION OF THE DRAWINGS

References are made to the accompanying drawings that form a part of this disclosure and which illustrate the embodiments in which systems and methods described in this specification can be practiced.

FIG. 4A illustrates a side cross-sectional view of a disengaged caster of a handheld electric lift, according to an embodiment.

Like reference numbers represent like parts throughout.

DETAILED DESCRIPTION

Figure 1:
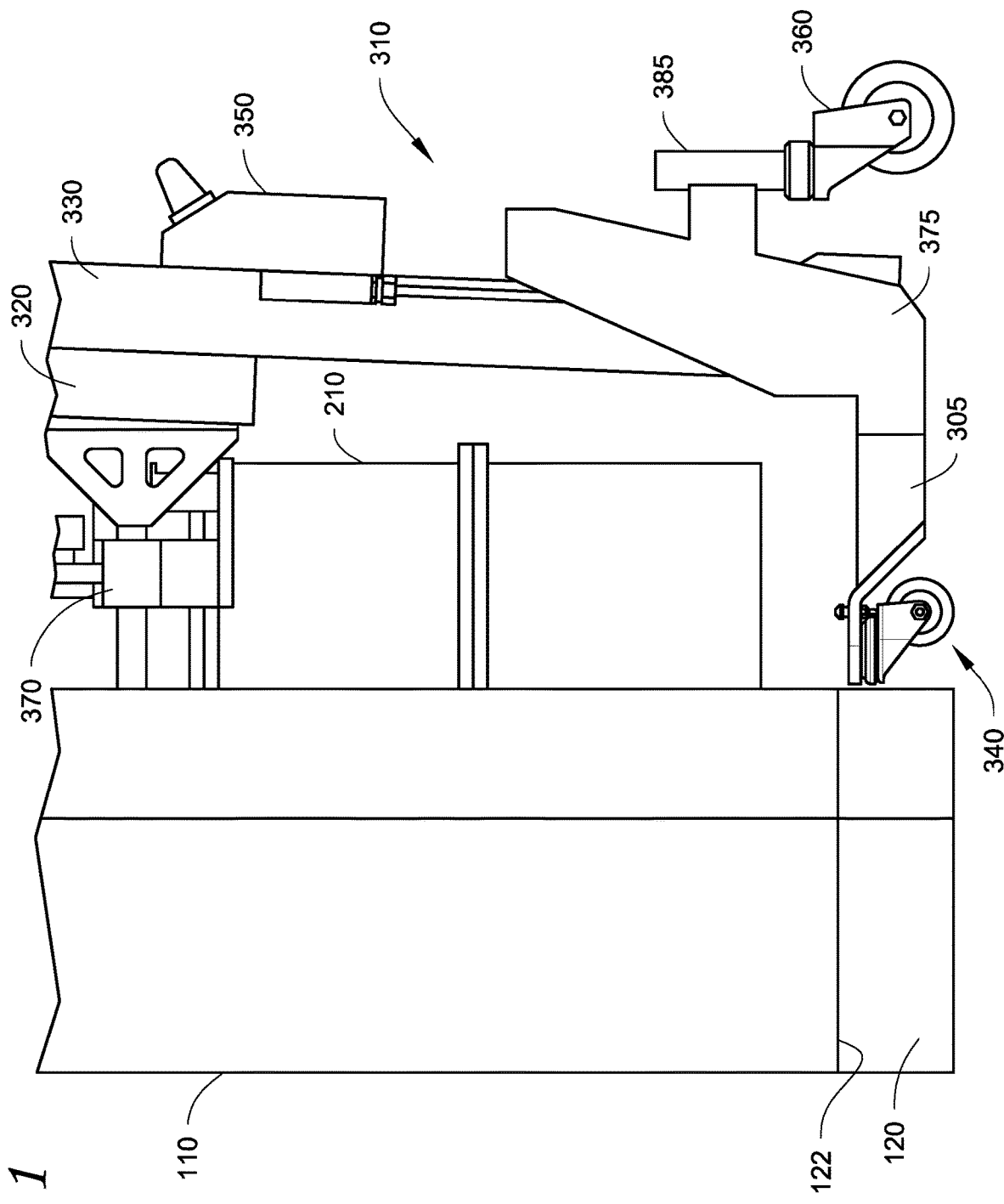
FIG. 1 illustrates a side view of a handheld electric lift of a delivery system lifting a vaporizer vessel to install the vaporizer vessel into a cabinet, according to an embodiment.

This disclosure relates generally to installing and/or removing vaporizer vessel(s) into and/or from a cabinet (e.g., a solid delivery cabinet). More specifically, the disclosure relates to apparatus and systems for installing and/or removing vaporizer vessel(s) into and/or from a solid delivery cabinet using a handheld electric lift with stopper(s) interacting with channel(s) of the solid delivery cabinet to engage and/or disengage with wheel(s) of the handheld electric lift.

The following definitions are applicable throughout this disclosure. As defined herein, the term "solid delivery cabinet" may refer to e.g., a cabinet (e.g., a cupboard with shelves) for storing a vessel (e.g., a solid delivery vaporizer vessel, etc.).

As defined herein, the term "solid delivery vaporizer" may refer to e.g., a vaporizer in which solid reactive agents such as aluminum trichloride (e.g., $AlCl_3$) or any other suitable chemical is provided for volatilization when the vaporizer is heated.

As defined herein, the term "vessel" or "vaporizer vessel" may refer to e.g., a vessel adapted to hold a source reagent. In an embodiment, the vessel can have a cylindrical shape machined to very close tolerances (e.g., in a range of $1/1000^{th}$ to $3/1000^{th}$ of an inch). It will be appreciated that different embodiments of vaporizers and/or vessels are described in U.S. Pat. No. 8,821,640, which is hereby incorporated by reference in its entirely. In an embodiment, the "vessel" may also refer to e.g., an "ampoule". It will be appreciated that different embodiments of vaporizers and/or ampoules are described in U.S. Pat. No. 6,921,062, which is hereby incorporated by reference in its entirely.

As defined herein, the term "altitude" may refer to e.g., a height of an object or point in relation to a ground level. For example, in operation, the handheld electric lift is disposed on a ground surface with its wheel(s) touching the ground surface, and the altitude of the stopper can a distance from the ground surface to a highest point of the stopper in a vertical direction.

Particular embodiments of the present disclosure are described herein with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements that may perform the same, similar, or equivalent functions.

The scope of the disclosure should be determined by the appended claims and their legal equivalents, rather than by the examples given herein. Moreover, no element is essential to the practice of the disclosure unless specifically described herein as "critical" or "essential".

It will be appreciated that using the delivery system(s) disclosed herein in semiconductor manufacturing applications can have specific advantages and can solve particular technical problems. For example, the clearance area (e.g., of the channel(s)) under the solid delivery cabinet is sized such that if the wheel(s) swivels in the channel(s), the handheld electric lift would not be able to be removed from under the solid delivery cabinet or be accommodated into the channel. That is, because the channels are sized to allow the wheel(s) to swivel or rotate as the wheel(s) are removed, the wheel(s) need to be locked (from swiveling) as the vaporizer vessel(s) being installed and need to stay locked (from swiveling) until the wheels being fully removed from the cabinet. If an operator would be required to manually lock the wheels, there can be a chance that the locking step be missed, and the lift can be caught in the small clearance area. The locking needs to be done automatically and reliably.

It will also be appreciated that the solid delivery cabinet is typically installed in a narrow area (e.g., a corridor having a width of at or about 23 inches to at or about 26 inches). In an application, the narrow area can be a "U" shape. As such, the wheel(s) has to be in a straight position (and cannot turn in any other direction) for the wheel(s) to move forward and/or backward when moving into and out of the channel(s) of the solid delivery cabinet, to avoid the wheel(s) being caught in the channel(s) underneath the solid delivery cabinet. Also, because of the small footprint of the corridor, after the wheel(s) being pulled out from the channel(s) underneath the solid delivery cabinet, or before the wheel(s) being pushed into the channel(s), the wheel(s) need to be able to swivel and/or move freely in any direction for an operator to slide the handheld electric lift sideways into and/or out of the corridor (a tight space).

Embodiments disclosed herein provide a directional locking mechanism (e.g., a stopper engaged/disengaged with the wheel) working in conjunction with the channel(s) (e.g., having a predetermined altitude) of the solid delivery cabinet to prevent the wheel(s) from being caught in the narrow corridor, especially when the wheel(s) of the handheld electric lift slide under the solid delivery cabinet, the stopper can prevent the wheel(s) from swiveling around. That is, when being activated (e.g., being pressed down and engaged with the wheel(s)), the locking mechanism is configured to prevent the wheel(s) from swiveling and only allow forward and/or backward movement of the wheel(s).

It will further be appreciated that safety and other requirements (e.g., SEMI standards) for installation and removal of vaporizer vessel(s) need to be met. As such, the lift lifting the vaporizer vessel(s) needs to be narrow enough to be fit in the narrow corridor, be able to slide into the corridor sideways and then be pushed forward to properly place the vaporizer vessel(s) into the cabinet, having a weight capacity capable of safely lifting the vaporizer vessel(s) t (e.g., with a heavy-duty electric motor such as a constant torque motor, etc.), and be light enough (e.g., the weight of the lift being at or under 100 pounds) to be pushed/moved by an operator while the lift action needs to be electric (e.g., non-manual movement/lifting). It will be appreciated that constant torque motors can be considered as "heavy-duty" motors since they may experience high torque loads through their "ON" cycle, unlike variable torque motors that typically drive fans and/or pumps and may not require much power once the variable torque motors are up and running. In addition, the production floor (on which the cabinet is installed) is typically grated floor, which requires wheel(s) having a diameter within a particular range (e.g., the diameter of the wheel being at or greater than 2 inches). Swivel wheel(s) having such a diameter sized to swivel and move freely on the grated floor.

Embodiments disclosed herein provide a delivery system (e.g., having a handheld electric lift with fully swiveling wheel(s) and stopper(s)) to meet the safety, weight, and other requirements for the semiconductor manufacturing applications.

FIG. 1 illustrates a side view of a lift 310 of a delivery system (110, 210, 310) lifting a vessel 210 to install the vessel 210 into a cabinet 110, according to an embodiment. It will be appreciated that FIG. 1 can also illustrate the lift 310 lifting vessel 210 to remove the vessel 210 from the cabinet 110. It will also be appreciated that in an embodiment, the delivery system can include the lift 310 and the cabinet 110 without the vessel 210.

Figure 2:
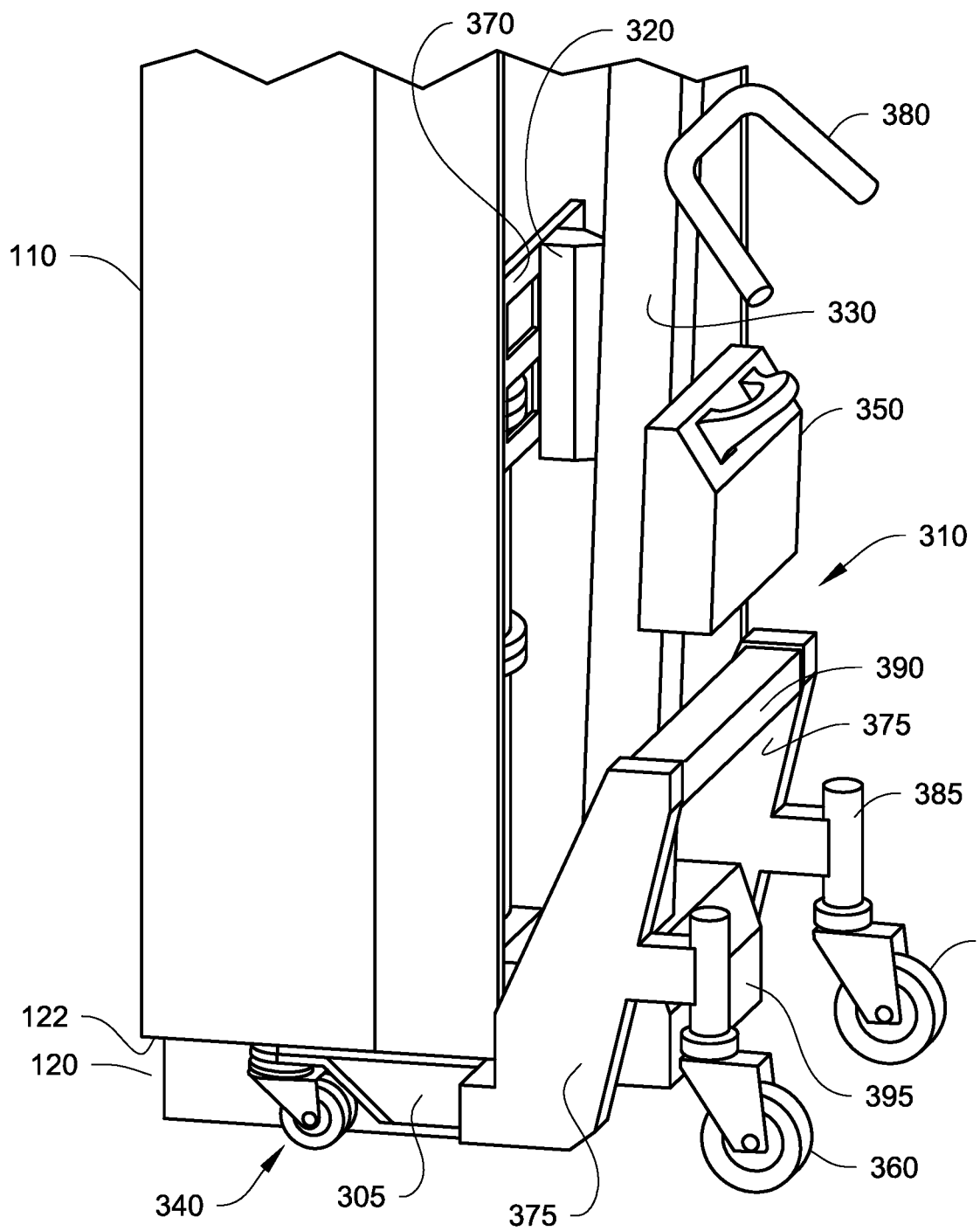
FIG. 2 illustrates a back-side view of a handheld electric lift of a delivery system interacting with a cabinet, with the vaporizer vessel being installed into the cabinet, according to an embodiment.

FIG. 2 illustrates a back-side view of the lift 310 of the delivery system (110, 210, 310) interacting with the cabinet 110, with the vessel 210 being installed into the cabinet 110, according to an embodiment. It will be appreciated that FIG. 2 can also illustrate the lift 310 interacting with the cabinet 110 to remove the vessel 210 from the cabinet 110.

In an embodiment, the lift 310 can be a handheld electric lift. In an embodiment, the handheld electric lift can have a width of at or about 21 inches. The handheld electric lift 310 includes an elongated mast 330 extending e.g., in a vertical direction. The handheld electric lift 310 also includes an effector 320 attached to the mast 330. The effector 320 can be controlled by an electric power source 350 of the handheld electric lift 310 to move along the mast 330. The handheld electric lift 310 further includes a handler 380 configured to move the handheld electric lift 310 (e.g., by an operator). Also the handheld electric lift 310 includes caster(s) 340, 360. In an embodiment, the handheld electric lift 310 includes two front casters 340 and two back casters 360. In an embodiment, one or more of the back casters 360 can have brake(s) (e.g., foot brake(s), etc.) to prevent the handheld electric lift 310 from moving forward and/or backward.

In an embodiment, the handheld electric lift 310 further includes a holder 370 attached to the effector 320. The holder 370 is configured to hold e.g., the vessel 210 so that the vessel 210 can be moved along the mast 330 (e.g., being lifted up and down) when the effector 320 being controlled by the electric power source 350 which is controlled by, e.g., an operator.

In an embodiment, the vessel 210 can be a vaporizer vessel. The vaporizer vessel can have a minimum weight of at or about 120 pounds, and/or a maximum weight of at or about 200 pounds.

In an embodiment, the handheld electric lift 310 also includes leg(s) 305, body portion(s) 375, and/or adapter(s) 385. The handheld electric lift 310 can include two legs 305, two body portions 375, and two adapters 385. Each leg 305 is connected (e.g., fixed, attached, etc.) to a caster 340 and a body portion 375. Each body portion 375 is connected (e.g., fixed, attached, etc.) to an adapter 385. Each adapter 385 is connected (e.g., fixed, attached, etc.) to a caster 360. A first intermediate bar 390 of the handheld electric lift 310 is configured to connect upper portions of the two body portions 375. A second intermediate bar 395 of the handheld electric lift 310 is configured to connect lower portions of the two body portions 375. The mast 330 is connected (e.g., fixed, attached, etc.) to a middle portion of the second intermediate bar 395.

In an embodiment, in operation, all casters 340, 360 are disposed on and touching the ground surface, and all other components of the handheld electric lift 310 are spaced apart from the ground surface.

In an embodiment, the cabinet 110 can be a solid delivery cabinet. The solid delivery cabinet 110 can include one or more shelves arranged (e.g., side by side) in a horizontal direction. Each shelf can be configured to accommodate a vaporizer vessel 210. The solid delivery cabinet 110 includes channel(s) 120 disposed at the bottom of the solid delivery cabinet 110. In an embodiment, the solid delivery cabinet 110 includes two channels 120. Each channel 120 has a recess with a top wall 122 and can accommodate a caster 340. The solid delivery cabinet 110 can be fixed (e.g., bolted, or via any other suitable attachment mechanism(s)) to the production floor (e.g., a grated floor, etc.) permanently.

Figure 3:
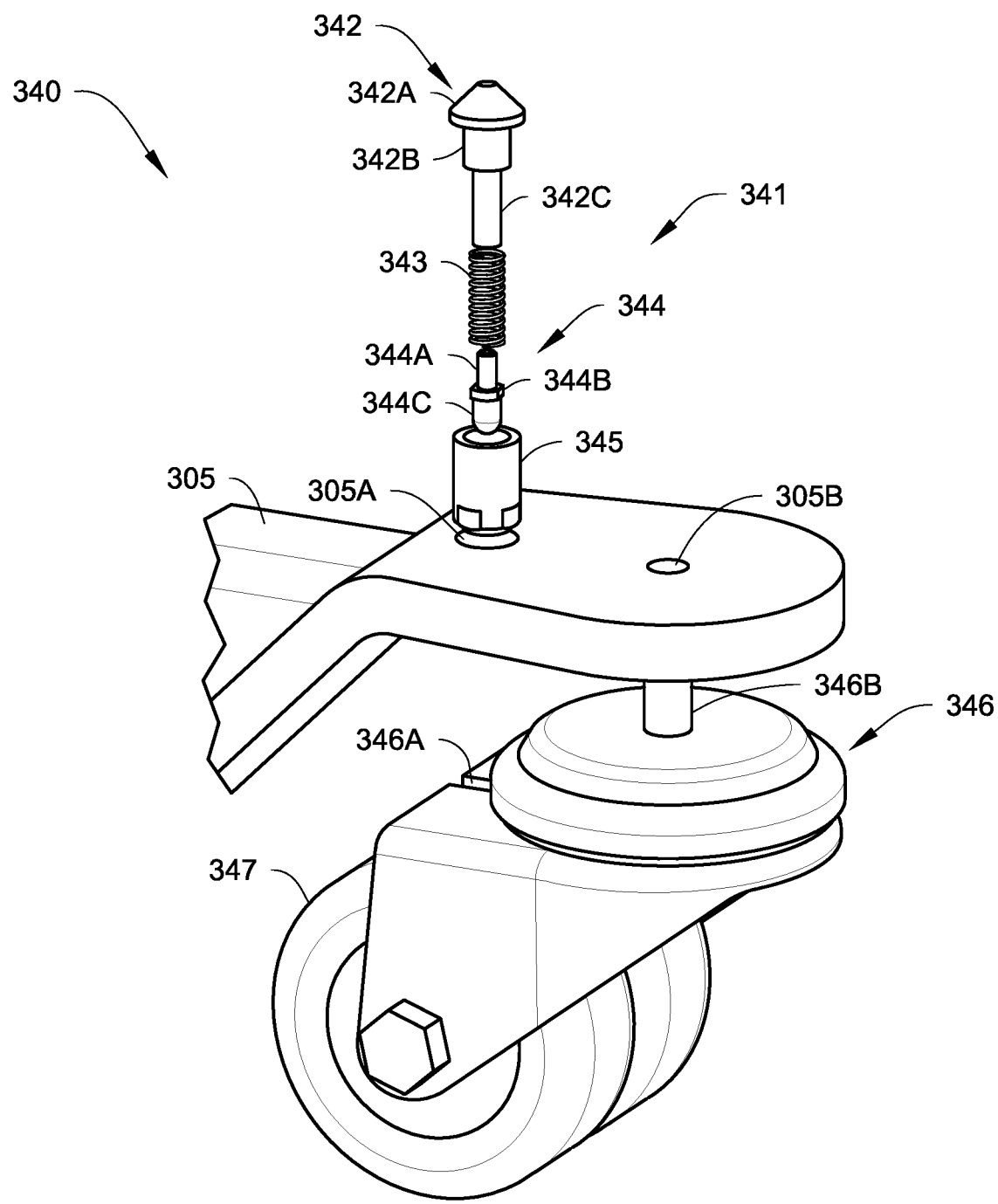
FIG. 3 illustrates an exploded view of a caster of a handheld electric lift, according to an embodiment.

FIG. 3 illustrates an exploded view of a caster 340 of a handheld electric lift 310 of FIGS. 1 and 2, according to an embodiment.

It will be appreciated that the embodiments described and recited herein are not limited to the quantity, size(s), and/or shape(s), etc. described. That is, the quantity, size(s), and/or shape(s), etc. described and recited herein are provided for descriptive purposes only and are not intended to be limiting.

As shown in FIG. 3, the caster 340 includes a stopper 341, a wheel 347, and a connector (or frame) 346. In an embodiment, the wheel 347 can be a low profile wheel having a compact frame. In an embodiment, the caster 340 can include at least two wheels 347 arranged side by side. The leg 305 includes a first opening 305A and a second opening 305B in an end portion of the leg 305. The connector 346 includes a recess 346A and a projection 346B. In an embodiment, the recess 346A can be an opening. The projection 346B extends in e.g., a vertical direction. The projection 346B is configured so that a diameter of the projection 346B is slightly less than, slightly greater than, or the same as a diameter of the second opening 305B. The projection 346B can pass through the second opening 305B to connect (e.g., fix, attach, etc.) the caster 340 to the leg 305 using e.g., any suitable connection (e.g., press fit, interference fit, fastener(s), adhesive(s), etc.). An upper surface of the projection 346B can be flush with an upper surface of the end portion of the leg 305 (see e.g., FIG. 4A below).

In an embodiment, the stopper 341 includes a pin (342, 344). The pin (342, 344) can be elongated. The pin (342, 344) includes an integral upper portion 342 and an integral lower portion 344. The upper portion 342 includes a head 342A, a neck 342B, and a body 342C. The lower portion 344 includes a protrusion 344A, a shoulder 344B, and a bottom 344C. The stopper 341 also includes an elastomer 343. In an embodiment, the elastomer 343 can be a spring, or any suitable elastic component(s), etc. The stopper 341 further includes an enclosure 345.

Figure 4B:
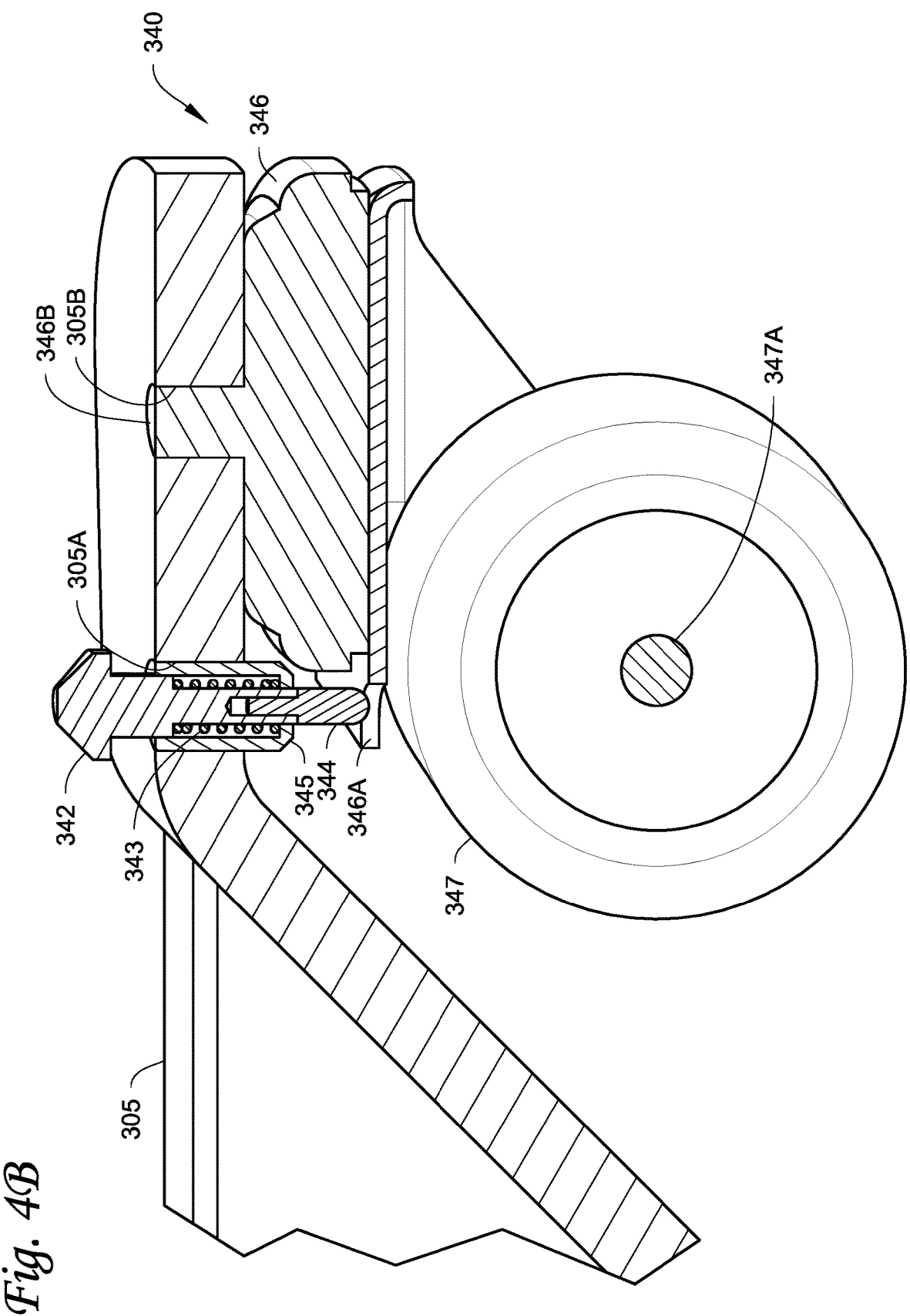
FIG. 4B illustrates a cross-sectional view of the disengaged caster of the handheld electric lift of FIG. 4A at a different angle, according to an embodiment.
Figure 4C:
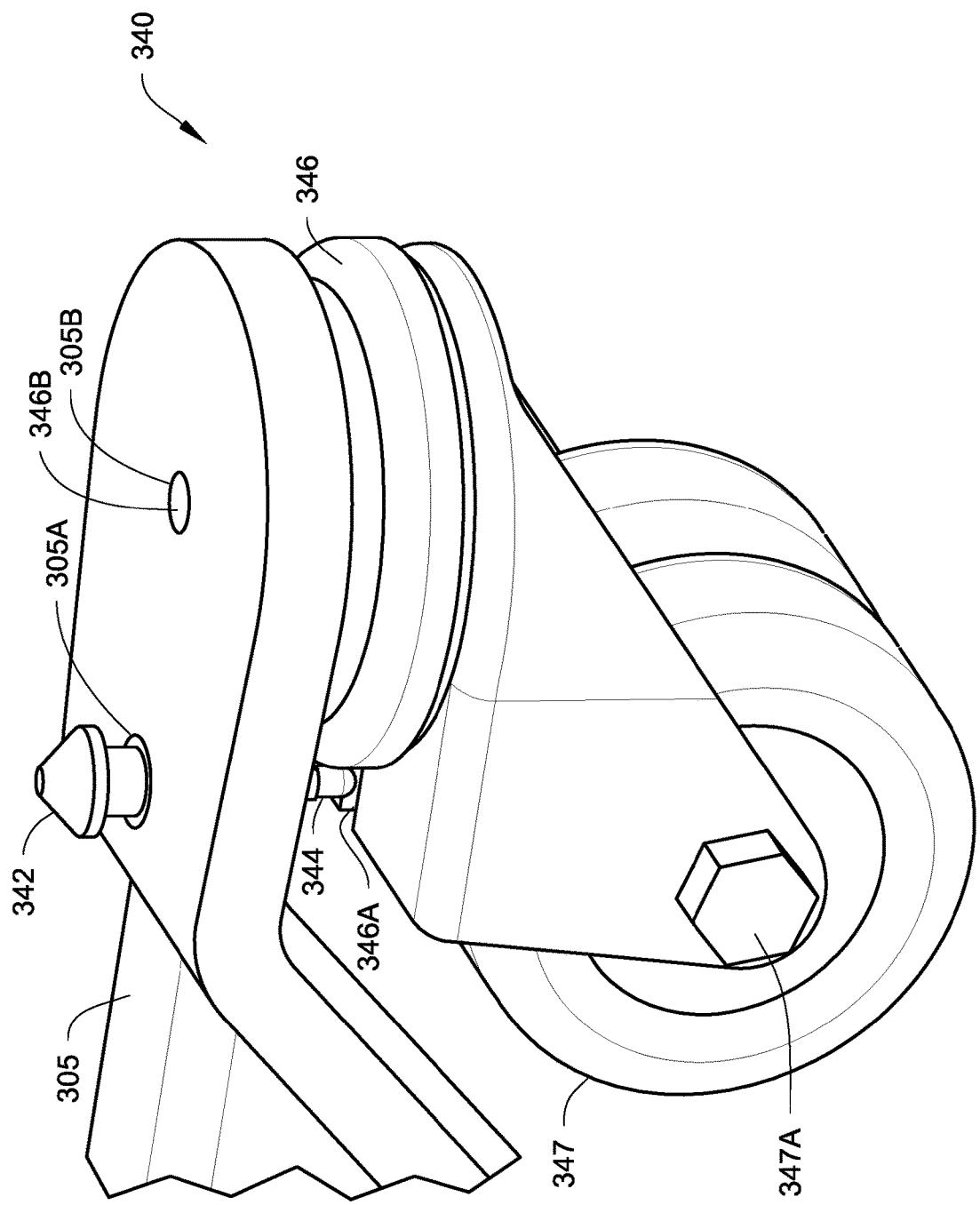
FIG. 4C illustrates a front-side view of the disengaged caster of the handheld electric lift of FIG. 4A, according to an embodiment.

FIG. 4A illustrates a side cross-sectional view of a disengaged caster 340 of a handheld electric lift 310, according to an embodiment. FIG. 4B illustrates a cross-sectional view of the disengaged caster 340 (of the handheld electric lift 310) of FIG. 4A at a different angle, according to an embodiment. FIG. 4C illustrates a front-side view of the disengaged caster 340 (of the handheld electric lift 310) of FIG. 4A, according to an embodiment.

In an embodiment, the head 342A has a cone shape having a flat or curved top and a cylinder bottom. The neck 342B has a cylinder shape. At least a portion of the neck 342B is housed within the enclosure 345. The enclosure 345 is hollow and has an upper opening and a lower opening. The neck 342B is configured so that a diameter of the neck 342B is slightly smaller than a diameter of the upper opening (i.e., an inner diameter of the enclosure 345), so that the neck 342B can slide in a vertical direction in the enclosure 345. The neck 342B can be housed in the enclosure 345 with no or slight clearance between the inner surface of the enclosure 345 and the outer surface of the neck 342B. The cylinder bottom of the head 342A is configured so that a diameter of the cylinder bottom is greater than the inner diameter of the enclosure 345, so that the cylinder bottom can be stopped from further moving down in a vertical direction by an upper surface of the enclosure 345.

In an embodiment, the enclosure 345 is configured so that an outer diameter of the enclosure 345 is slightly less than, slightly greater than, or the same as a diameter of the first opening 305A. The enclosure 345 can pass through the first opening 305A to connect (e.g., fix, attach, etc.) the stopper 341 to the leg 305 using e.g., any suitable connection (e.g., press fit, interference fit, fastener(s), adhesive(s), etc.). The upper surface of the enclosure 345 can be flush with an upper surface of the end portion of the leg 305.

In an embodiment, the body 342C is configured so that a diameter of the body 342C is smaller than the diameter of the neck 342B. A lower portion of the body 342C has a recess to accommodate the protrusion 344A. The protrusion 344A can be housed in the recess of the body 342C with no or slight clearance between the inner surface of the recess and the outer surface of the protrusion 344A. The body 342C can rest on the shoulder 344B so that a lower surface of the body 342C can touch an upper surface of the shoulder 344B.

In an embodiment, the body 342C is configured so that a diameter of the body 342C is slightly smaller than a diameter of the lower opening of the enclosure 345, so that the body 342C can slide in a vertical direction through the lower opening of the enclosure 345. There can be no or slight clearance between the body 342C and the lower opening of the enclosure 345. At least a portion of the body 342C is housed within the enclosure 345. In an embodiment, the shoulder 344B is configured so that a diameter of the shoulder 344B is greater than the diameter of the lower opening of the enclosure 345, so that the shoulder 344B can be stopped from further moving up in a vertical direction by a lower surface of the enclosure 345.

In an embodiment, the spring 343 can be disposed inside the enclosure 345 and outside the body 342C. The spring 343 can be disposed between the neck 342B and a bottom inner surface of the enclosure 345 in a vertical direction. The spring 343 can be compressed by a force from the neck 342B, when the head 342A is pushed down (e.g., in a vertical direction). When there is no force on the head 342A (i.e., the head 342A is released), the spring 343 can be decompressed to release the neck 342B (and the head 342A) back to its un-pushed position. It will be appreciated that after the stopper 341 is assembled and connected to the leg 305, the upper portion 342 can connect (e.g., fix, attach, etc.) to the lower portion 344 using e.g., any suitable connection (e.g., press fit, interference fit, fastener(s), adhesive(s), etc.), by e.g., connecting the body 342C and the protrusion 344A together so that the pin (342, 344) can move up and/or down as a whole in a vertical direction by forces from e.g., the spring 343, the top wall 122 of the channel(s) 120 (see e.g., FIGS. 6C and 6D), etc.

In an embodiment, the recess 346A is configured so that a diameter of the recess 346A is greater than a diameter of the bottom 344C, so that the bottom 344C can slide in a vertical direction through the recess 346A to reach and engage with the wheel 347 when the head 342A is pushed down. When the head 342A is not pushed down, a bottom surface of the bottom 344C is at, above, or around an upper surface of the recess 346A, which is disposed above the wheel 347 in a vertical direction.

In an embodiment, the wheel 347 has a center 347A. In a vertical direction, an axis of the head 342A, an axis of the neck 342B, an axis of the body 342C, an axis of the spring 343, an axis of the enclosure 345, an axis of the protrusion 344A, an axis of the shoulder 344B, an axis of the bottom 344C are all aligned or overlapped with each other, and pass through the center 347A in a side plan view.

Figure 4D:
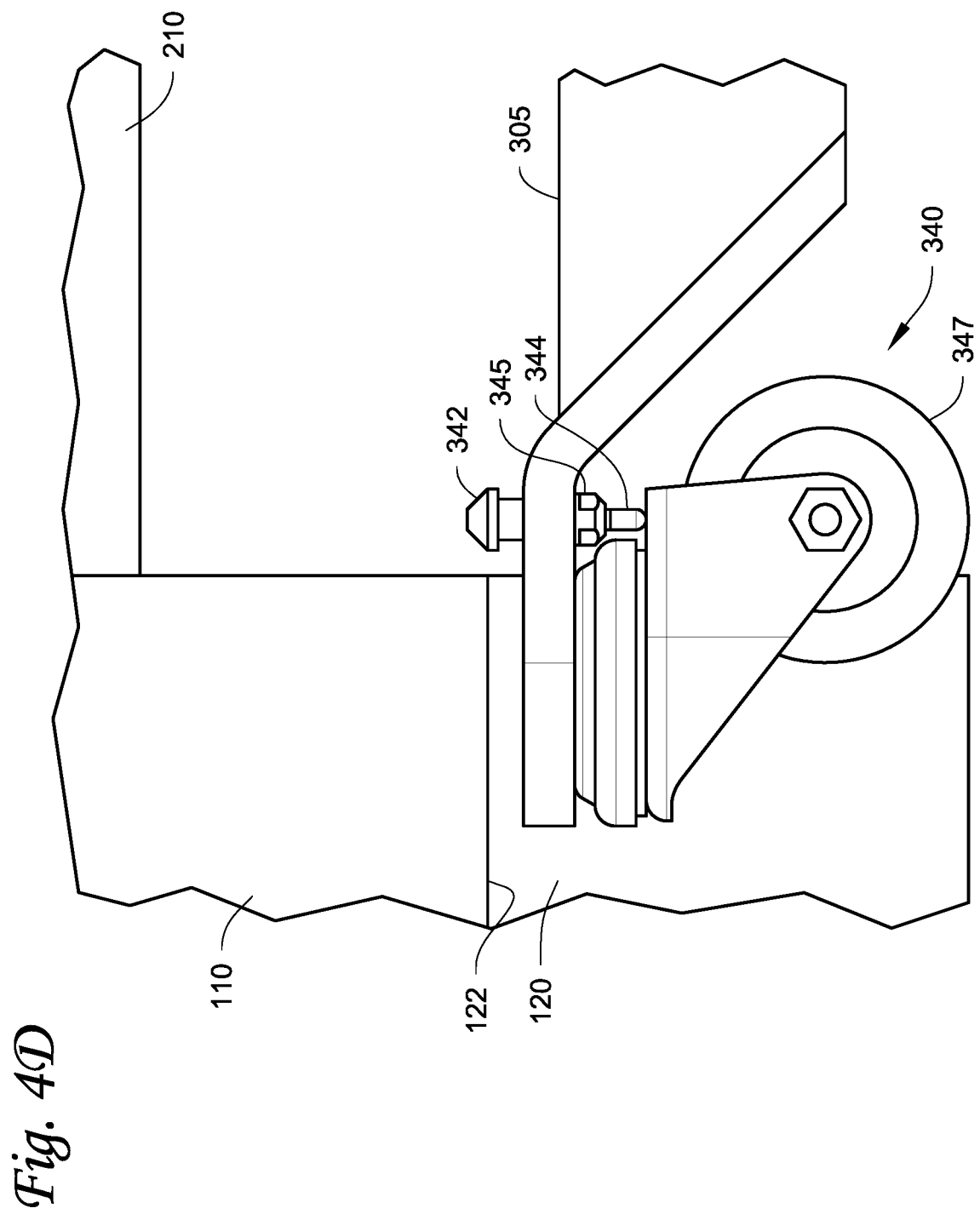
FIG. 4D illustrates a side view of the disengaged caster of the handheld electric lift of FIG. 4A in a delivery system, according to an embodiment.

FIG. 4D illustrates a side view of the disengaged caster 340 (of the handheld electric lift 310) of FIG. 4A in a delivery system (110, 210, 310), according to an embodiment.

As shown in FIG. 4D, an altitude of the top wall 122 of the channel 120 is lower than an altitude of a top of the head 342A of the upper portion 342, and is higher than an altitude of a bottom (e.g., the cylinder bottom) of the head 342A of the upper portion 342. The altitude of the top wall 122 of the channel 120 is higher than all other components of the caster 340 and all other components of the leg 305 so that the caster 340 can be accommodated in the channel 120.

Figure 5:
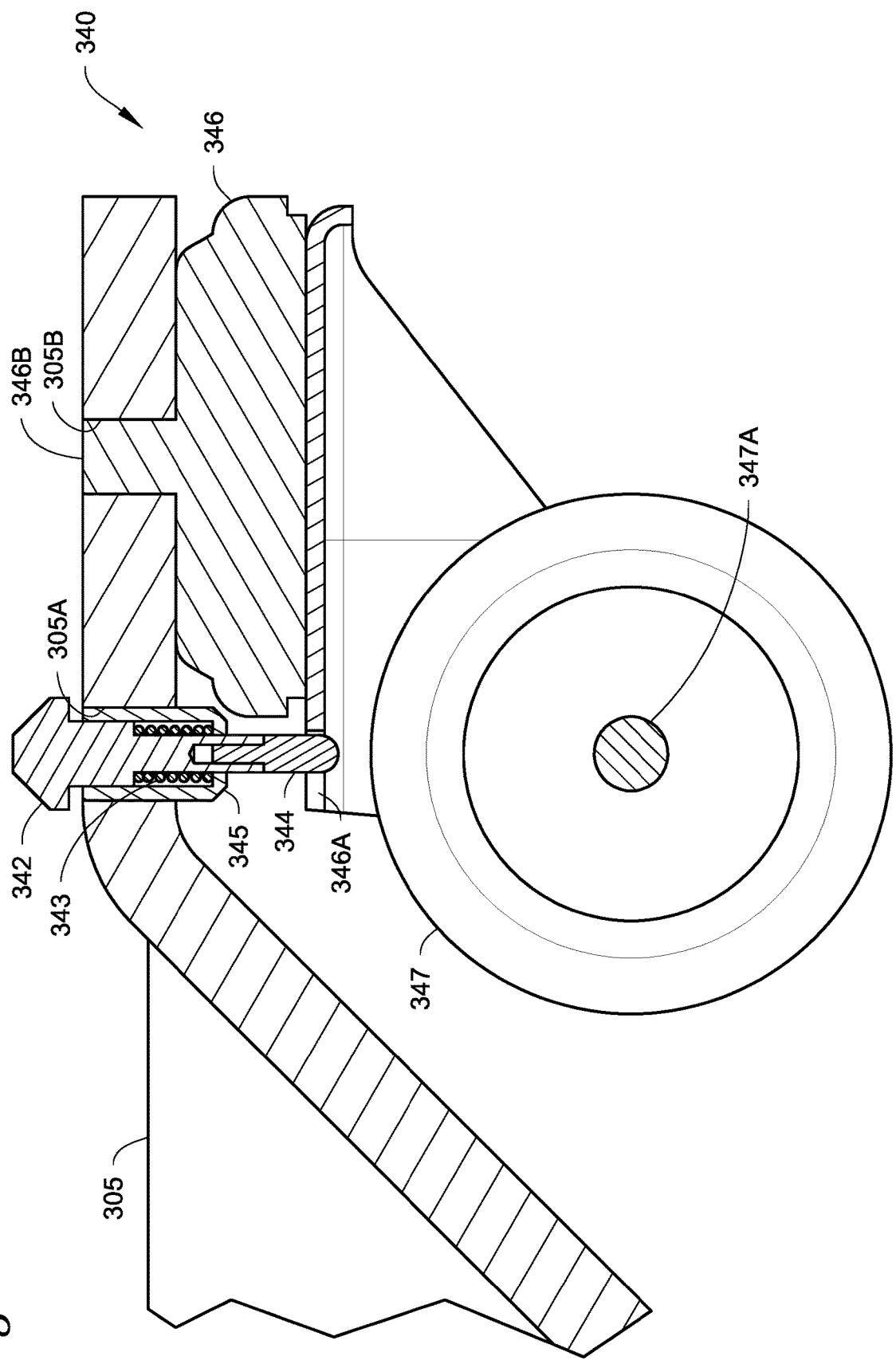
FIG. 5 illustrates a side cross-sectional view of a caster of a handheld electric lift, according to an embodiment.

FIG. 5 illustrates a side cross-sectional view of a caster 340 of a handheld electric lift 310, according to an embodiment. As shown in FIG. 5, the head 342A of the upper portion 342 of the stopper 341 is pushed down in a vertical direction so that the bottom of the lower portion passes through the recess 346A, but the stopper 341 is not pushed down enough to engage with the wheel 347. That is, the stopper 341 is still above the wheel 347 and not engaged with the wheel 347 to prevent the wheel 347 from swiveling around.

Figure 6A:
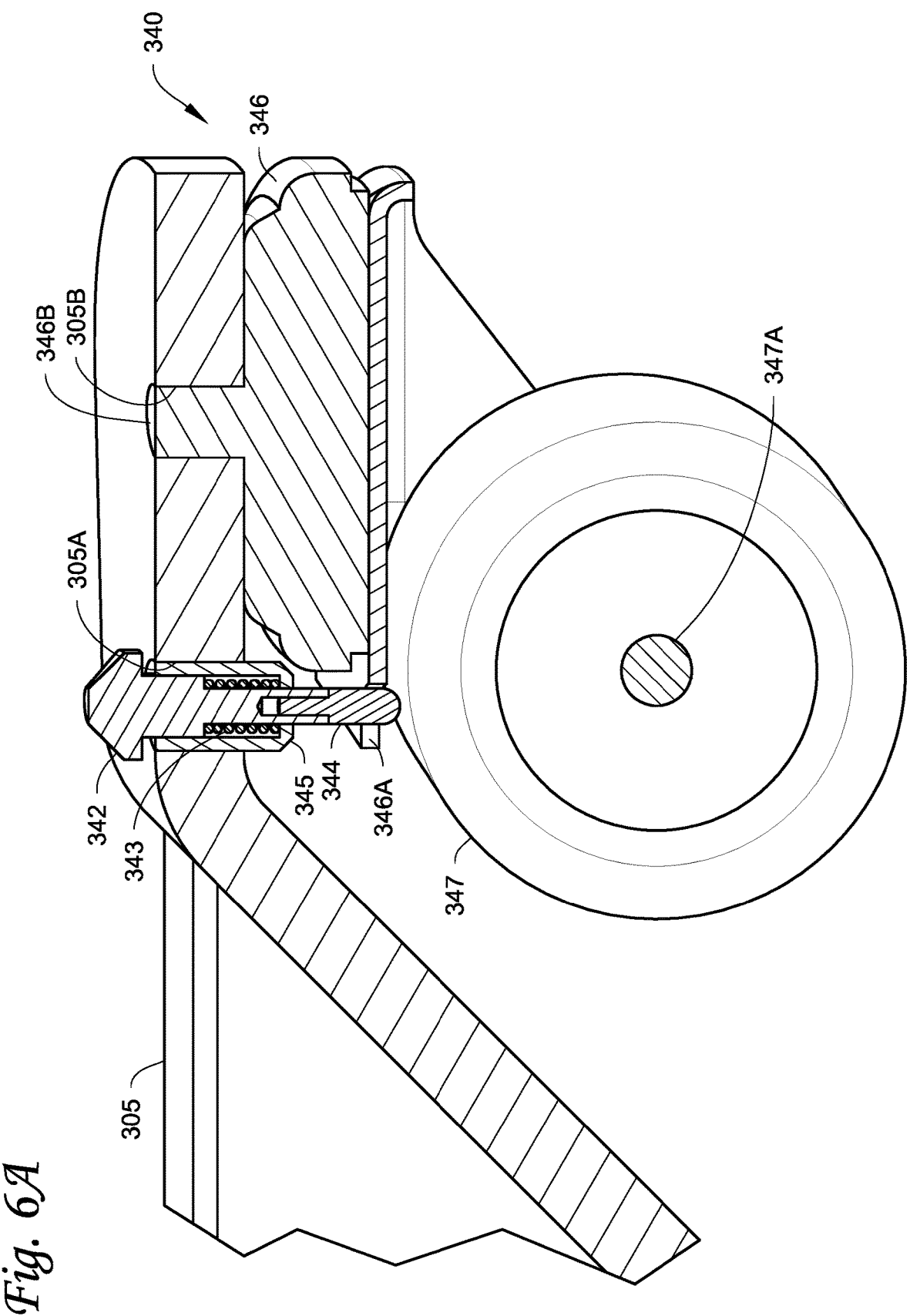
FIG. 6A illustrates a cross-sectional view of an engaged caster of a handheld electric lift, according to an embodiment.
Figure 6B:
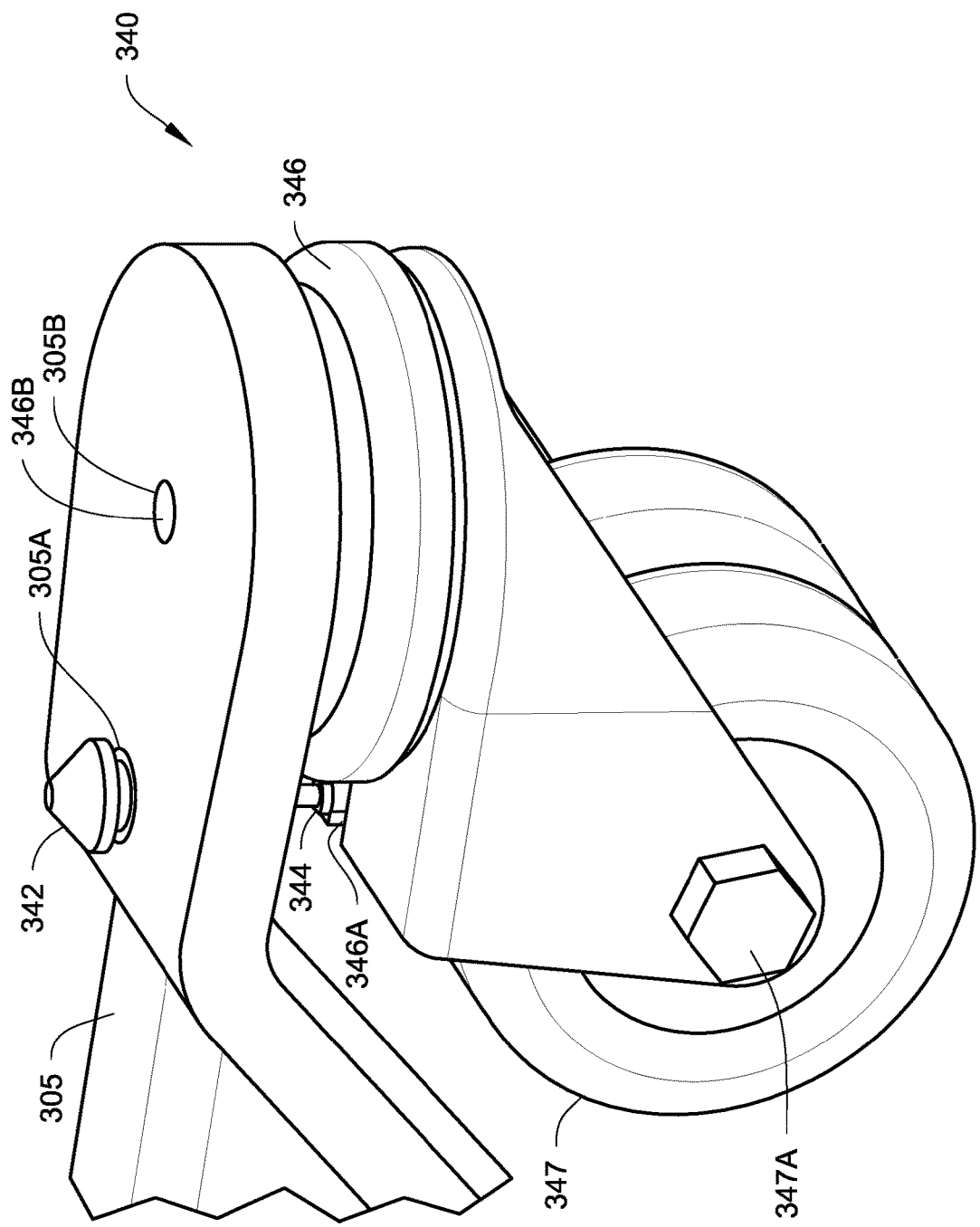
FIG. 6B illustrates a front-side view of the engaged caster of the handheld electric lift of FIG. 6A, according to an embodiment.
Figure 6C:
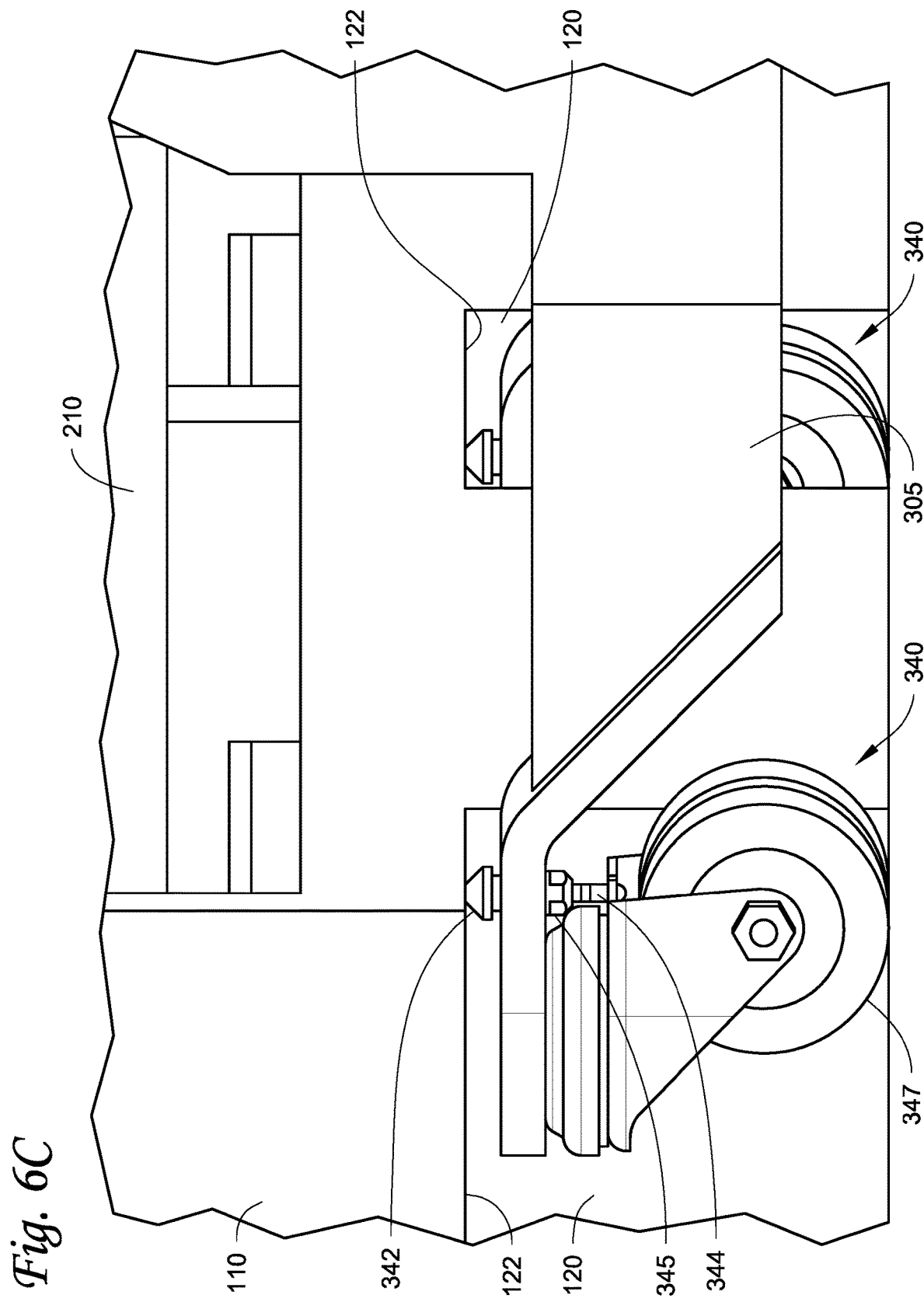
FIG. 6C illustrates a back-side view of the engaged caster of the handheld electric lift of FIG. 6A in a delivery system, according to an embodiment.
Figure 6D:
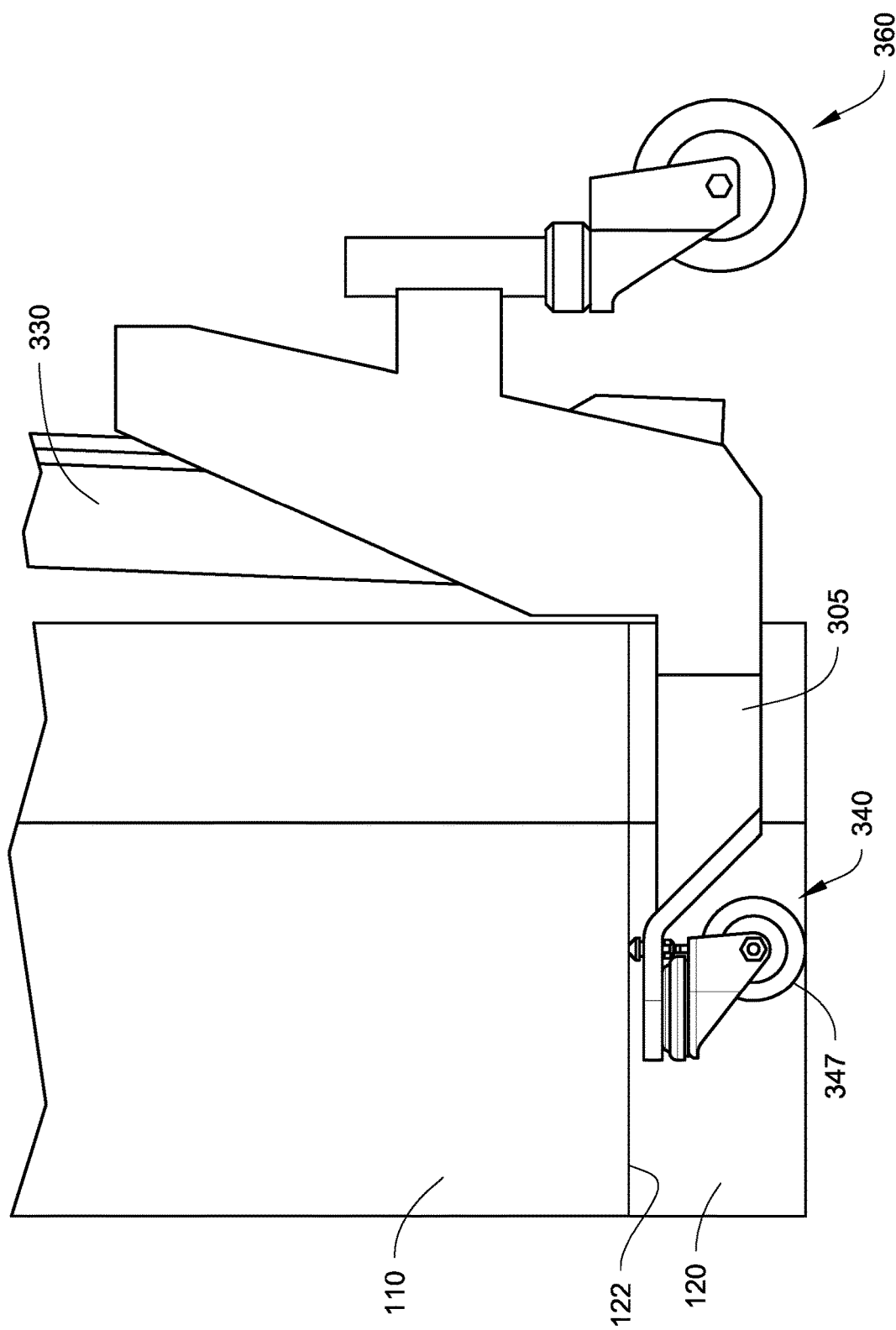
FIG. 6D illustrates a side view of the engaged caster of the handheld electric lift of FIG. 6A in a delivery system, according to an embodiment.

FIG. 6A illustrates a cross-sectional view of an engaged caster 340 of a handheld electric lift 310, according to an embodiment. FIG. 6B illustrates a front-side view of the engaged caster 340 (of the handheld electric lift 310) of FIG. 6A, according to an embodiment. FIG. 6C illustrates a back-side view of the engaged caster 340 (of the handheld electric lift 310) of FIG. 6A in a delivery system (110, 210, 310), according to an embodiment. FIG. 6D illustrates a side view of the engaged caster 340 (of the handheld electric lift 310) of FIG. 6A in a delivery system (110, 310), according to an embodiment.

In an embodiment, in operation, the wheel 347 of the caster 340 is disposed on a floor (e.g., a fabrication floor such as a grated floor, etc.). When the caster 340 moves towards the channel 120, the top wall 122 of the channel 120 can touch the cone shaped head 342A of the upper portion 342. As the caster 340 moves further towards and into the channel 120, the top wall 122 of the channel 120 can push the stopper 341 (the upper portion 342 and the lower portion 344) down in a vertical direction and compress the spring 343, by sliding over the side of the cone shaped head 342A and reaching the top surface of the head 342A. It will be appreciated that the cone shape design (or a discus design, a curved shape design, or any other suitable design) of the head 342A can enable such sliding. The channel 120 is configured so that when the whole stopper 341 of the caster 340 is accommodated in the channel 120 (see FIGS. 6C and 6D), the bottom 344C of the lower portion 344 is engaged with the wheel 347 to prevent the wheel 347 from swiveling. That is, the altitude of the top wall 122 of the channel 120 (i.e., the altitude of the fully pushed top of the head 342A) ensures that the bottom 344C of the lower portion 344 is engaged with the wheel 347 to prevent the wheel 347 from swiveling when the whole stopper 341 of the caster 340 is accommodated in the channel 120. It will be appreciated that the wheel 347 can still move backwards and/or forwards in a direction towards or away from the channel 120 when the bottom 344C of the lower portion 344 is engaged with the wheel 347 to prevent the wheel 347 from swiveling.

In an embodiment, in operation, when the whole stopper 341 of the caster 340 is accommodated in the channel 120, and the caster 340 moves away from the channel 120, the top of the head 342A starts spacing apart from the top wall 122 of the channel 120 (i.e., the stopper 341 is not pushed by the top wall 122), and the spring 343 of the stopper 341 decompresses and pushes the stopper 341 up in the vertical direction so that the stopper 341 disengages with the wheel 347 to allow the wheel 347 to swivel when the stopper 341 is released from the wheel 347.

Figure 7A:
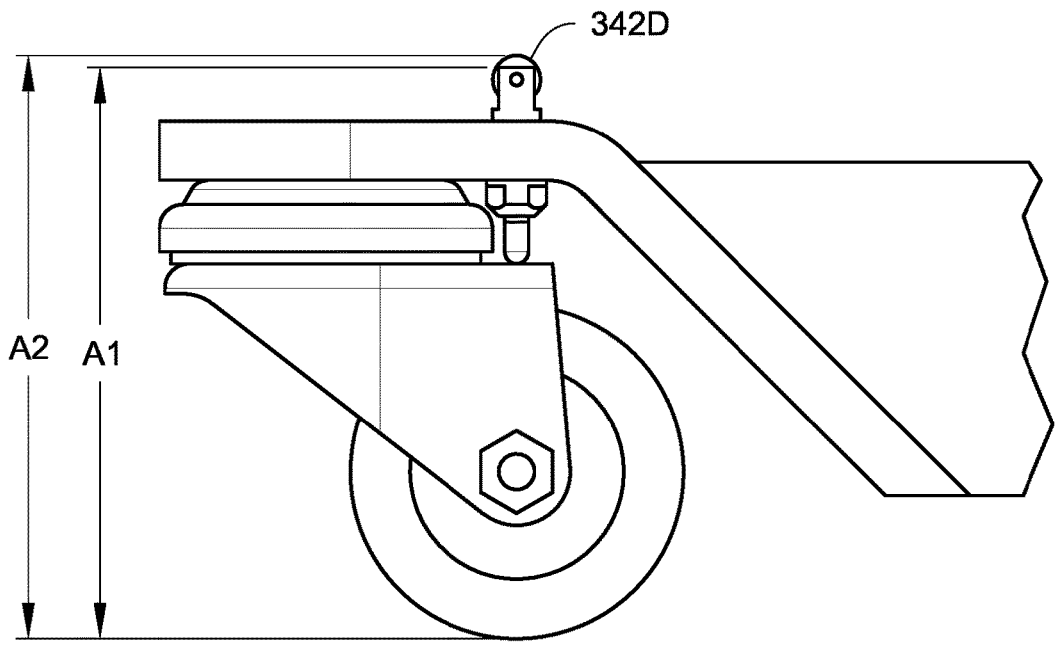
FIG. 7A illustrates a side view of a disengaged caster of a handheld electric lift, according to an embodiment.
Figure 7B:
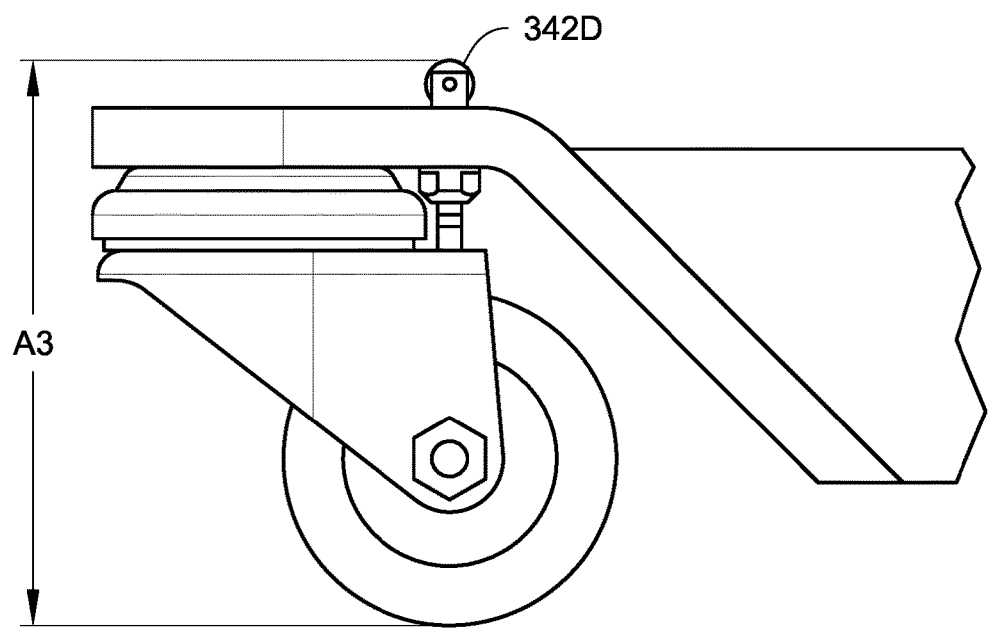
FIG. 7B illustrates a side view of an engaged caster of a handheld electric lift, according to an embodiment.

FIG. 7A illustrates a side view of a disengaged caster of a handheld electric lift 310, according to an embodiment. FIG. 7B illustrates a side view of an engaged caster of a handheld electric lift 310, according to an embodiment. The head 342D in FIGS. 7A and 7B has different design from the header 342A in FIGS. 1-6D. Other components of the stopper in FIGS. 7A and 7B can be the same as those in FIGS. 1-6D.

As shown in FIGS. 7A and 7B, the head 342D has a discus shape and is attached to the neck of the stopper. In an embodiment, the head 342D can be fixed. In another embodiment, the head 342D can be rotatable along its axis in a direction perpendicular to the paper. When the stopper is disengaged with the wheel, the top of the head 342D has an altitude A2 and the neck of the caster (where the head 342D attached to) has an altitude A1. It will be appreciated that A1 is a location/altitude where an object (e.g., the top wall 122 of the channel 120, etc.) can start pressing the stopper (e.g., a pin) down so that the stopper engages with the wheel (e.g., engaging with a slot in the wheel) to prevent the wheel from swiveling. When the stopper is engaged with the wheel, the altitude of the top of the head 342D becomes A3, which is the altitude of the top wall of the channel(s) (e.g., channel(s) 120). A3 is less than A2. A1 is less than A2. In an embodiment, A3 can be less than A1. In another embodiment, A3 can be equal to A1. In an embodiment, A1, A2, and/or A3 can be designed so that when the stopper being pressed down, the stopper (e.g., a pin) can engage into the slot of the wheel by a distance of at or greater than 0.50 inches.

Figure 7C:
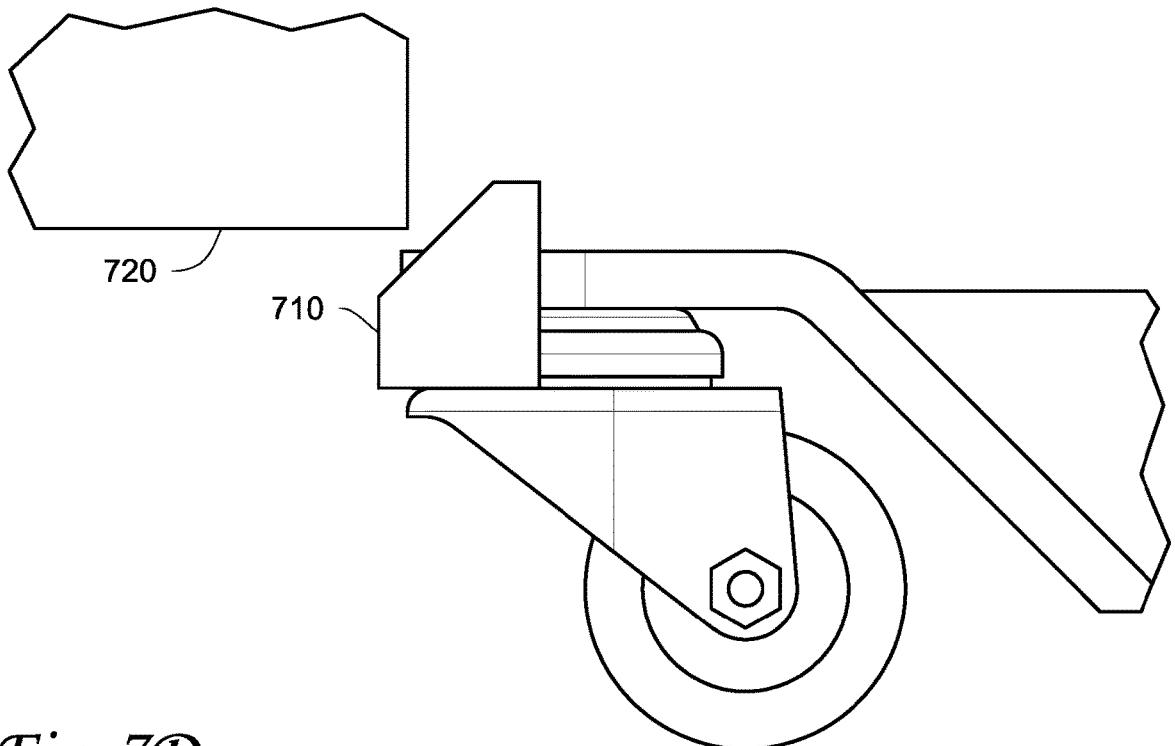
FIG. 7C illustrates a side view of a disengaged caster of a handheld electric lift, according to an embodiment.
Figure 7D:
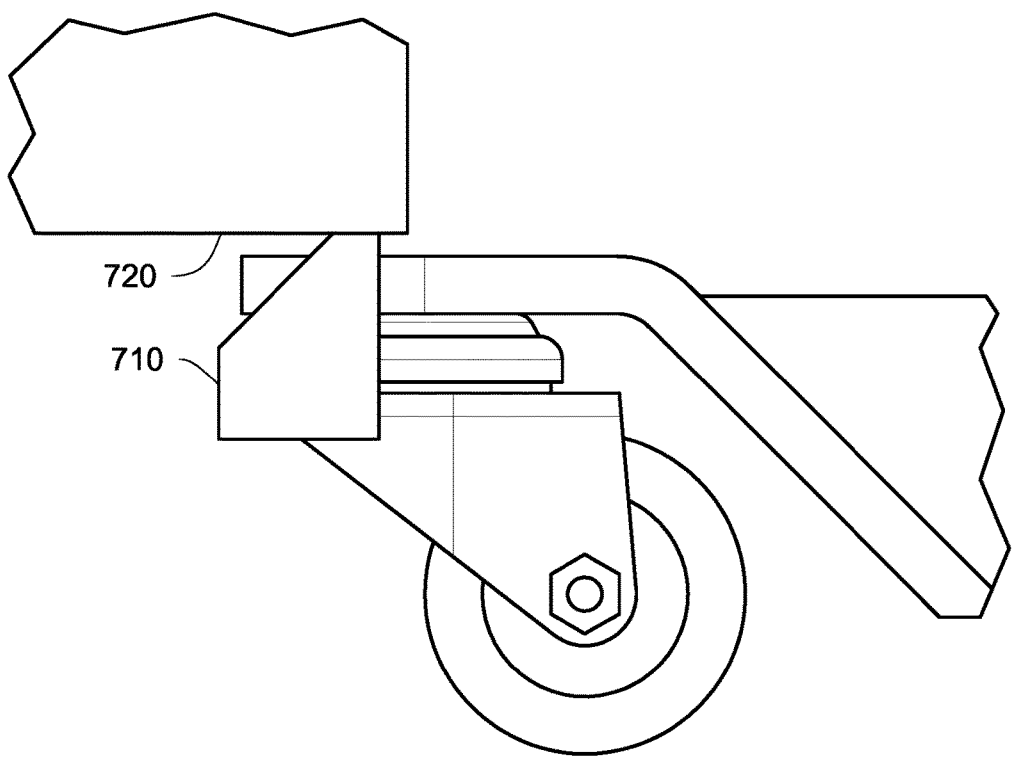
FIG. 7D illustrates a side view of an engaged caster of a handheld electric lift, according to an embodiment.

It will be appreciated that in some embodiments, other designs or variations of the stopper (e.g., key lock in a socket, etc.) can be employed to engage with the wheel to prevent the wheel from swiveling when e.g., the wheel is underneath the stopper. For example, FIG. 7C illustrates a side view of a disengaged caster of a handheld electric lift 310, according to an embodiment. FIG. 7D illustrates a side view of an engaged caster of a handheld electric lift 310, according to an embodiment. As shown in FIGS. 7C and 7D, the stopper 710 can be a spring loaded wheel catch (e.g., a flap or the like). The machine edge 720 can be designed or configured to force the stopper 710 down to prevent the wheel from swiveling.

Aspects:

Any of aspects 1-7 can be combined with any of aspects 8-20.

Aspect 1. A handheld electric lift, the lift comprising an elongated mast; an effector attached to the mast, the effector being controlled by an electric power source to move along the mast; a handler configured to move the lift; and at least one caster, wherein each of the at least one caster includes a stopper and a wheel, the stopper is elongated and is disposed above the wheel, the stopper is configured to engage with the wheel to prevent the wheel from swiveling when the stopper is pushed down, the stopper is further configured to disengage with the wheel to allow the wheel to swivel when the stopper is released.

Aspect 2. The handheld electric lift of aspect 1, wherein the wheel is a swivel wheel.

Aspect 3. The handheld electric lift of aspect 1 or aspect 2, wherein the at least one caster includes two front casters, the lift further comprises two back casters.

Aspect 4. The handheld electric lift of any one of aspects 1-3, wherein a width of the lift is at or about 21 inches.

Aspect 5. The handheld electric lift of any one of aspects 1-4, wherein a weight capacity of the lift ranges from at or about 120 pounds to at or about 200 pounds.

Aspect 6. The handheld electric lift of any one of aspects 1-5, wherein the stopper includes an elongated pin.

Aspect 7. The handheld electric lift of any one of aspects 1-6, wherein the stopper includes an elastomer, when stopper is not pushed, the elastomer is configured to release the stopper so that the stopper disengages with the wheel.

Aspect 8. A delivery system comprising a handheld electric lift configured to lift at least one vaporizer vessel; and a cabinet configured to hold the at least one vaporizer vessel, wherein the lift includes an elongated mast; an effector attached to the mast, the effector being controlled by an electric power source to move along the mast; a handler configured to move the lift; and at least one caster, wherein each of the at least one caster includes a stopper and a wheel, the stopper is elongated and is disposed above the wheel, the stopper is configured to engage with the wheel to prevent the wheel from swiveling when the stopper is pushed down, the stopper is further configured to disengage with the wheel to allow the wheel to swivel when the stopper is released, the cabinet includes at least one channel configured to accommodate the at least one caster.

Aspect 9. The delivery system of aspect 8, wherein the wheel is a swivel wheel.

Aspect 10. The delivery system of aspect 8 or aspect 9, wherein the at least one caster includes two front casters, the lift further comprises two back casters.

Aspect 11. The delivery system of aspect 10, wherein the at least one channel includes two channels, each of the two channels is configured to accommodate each of the two front casters, respectively.

Aspect 12. The delivery system of any one of aspects 8-11, wherein a width of the lift is at or about 21 inches.

Aspect 13. The delivery system of any one of aspects 8-12, wherein a weight capacity of the lift ranges from at or about 120 pounds to at or about 200 pounds.

Aspect 14. The delivery system of any one of aspects 8-13, wherein the stopper includes an elongated pin.

Aspect 15. The delivery system of any one of aspects 8-14, wherein the stopper includes an elastomer, when stopper is not pushed, the elastomer is configured to release the stopper so that the stopper disengages with the wheel.

Aspect 16. The delivery system of any one of aspects 8-15, wherein the at least one channel is disposed at a bottom of the cabinet.

Aspect 17. The delivery system of any one of aspects 8-16, wherein the at least one channel is configured such that a top wall of the at least one channel pushes down the stopper to prevent the wheel from swiveling when the at least one caster is accommodated in the at least one channel.

Aspect 18. The delivery system of any one of aspects 8-17, wherein the cabinet is fixed to a grated floor.

Aspect 19. The delivery system of aspect 18, wherein the cabinet is bolted to the grated floor.

Aspect 20. The delivery system of any one of aspects 8-19, wherein the at least one channel includes a top wall, when the stopper is disengaged with the wheel, an altitude of the top wall is lower than an altitude of the stopper such that the top wall pushes down the stopper and the stopper engages with the wheel when the at least one caster is accommodated in the at least one channel.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A delivery system comprising:
    a handheld electric lift configured to lift at least one vaporizer vessel; and
    a cabinet configured to hold the at least one vaporizer vessel,
    wherein the lift includes an elongated mast;
    an effector attached to the mast, the effector being controlled by an electric power source to move along the mast;
    a handler configured to move the lift; and
    at least four swiveling casters, including two swiveling, locking casters,
    wherein each of the two swiveling, locking casters include a stopper and a wheel, the stopper is elongated vertically and is disposed above the wheel, the stopper is configured to engage with the wheel to prevent the wheel from swiveling when the stopper is pushed down and fully engaged, the stopper is further configured to disengage with the wheel to allow the wheel to swivel when the stopper is released, the stopper further configured to allow the wheel to roll when the stopper is pushed down, the cabinet includes at least one channel comprising a top wall and configured to accommodate a swiveling, locking caster of the two swiveling, locking casters.

2. The delivery system of claim 1, wherein the at least one channel includes two channels, each of the two channels is configured to each accommodate one of the two swiveling, locking casters.

3. The delivery system of claim 1, wherein a width of the lift is at or about 21 inches.

4. The delivery system of claim 1, wherein a weight capacity of the lift ranges from at or about 120 pounds to at or about 200 pounds.

5. The delivery system of claim 1, wherein the stopper includes an elongated pin.

6. The delivery system of claim 1, wherein the stopper includes an elastomer, when stopper is not pushed, the elastomer is configured to release the stopper so that the stopper disengages with the wheel.

7. The delivery system of claim 1, wherein the at least one channel is disposed at a bottom of the cabinet.

8. The delivery system of claim 1, wherein the at least one channel is configured such that the top wall of the at least one channel pushes down the stopper to prevent the wheel from swiveling when the at least one swiveling, locking caster of the two swiveling, locking casters is accommodated in the at least one channel.

9. The delivery system of claim 1, wherein the cabinet is fixed to a grated floor.

10. The delivery system of claim 9, wherein the cabinet is bolted to the grated floor.

11. The delivery system of claim 1, wherein when the stopper is disengaged with the wheel, an altitude of the top wall is lower than an altitude of the stopper such that the top wall pushes down the stopper and the stopper engages with the wheel when the at least one swiveling, locking caster of the two swiveling, locking casters is accommodated in the at least one channel.

12. A delivery system comprising:
    a handheld electric lift configured to lift at least one vaporizer vessel, comprising:
    an elongated mast;
    an effector attached to the mast, the effector connected to an electrical power source to move along the mast;
    a plurality of swiveling casters including a plurality of non-locking casters and a plurality of locking casters, where the locking casters reversibly lock to prevent swiveling while allowing rolling of the casters; and
    a delivery cabinet configured to contain and heat the at least one vaporizer vessel, the delivery cabinet comprising multiple channels located on a bottom surface of the delivery cabinet, the multiple channels configured to receive a locking caster of the plurality of locking casters, wherein the locking casters automatically lock when entering a channel of the multiple channels and the locking casters automatically unlock when exiting the channel of the multiple channels.

13. The delivery system of claim 12, wherein the locking castors automatically lock by the bottom surface of the delivery cabinet in the channel pushing down a pin to lock the locking caster and wherein when removed from under the bottom surface of the delivery cabinet, an elastic member causes the pin to recoil and unlock the locking castor.

14. The delivery system of claim 12, wherein each of the plurality of channels comprising an upper surface made of the bottom surface of the delivery cabinet and two side surfaces, wherein the side surfaces are each joined to the upper surface along respective edges and the side surfaces are separated by a distance such that the locking caster cannot freely reverse when removing the cart from under the cabinet.

15. The delivery system of claim 12 further comprising a vaporizer vessel.

* * * * *